(12) United States Patent
Panchaksharaiah (10) Patent No.: US 11,854,580 B2
(45) Date of Patent: Dec. 26, 2023

(54) METHODS AND SYSTEMS FOR ENHANCING USER-GENERATED CONTENT

(71) Applicant: Rovi Guides, Inc., San Jose, CA (US)

(72) Inventor: Vishwas Sharadanagar Panchaksharaiah, Tiptur (IN)

(73) Assignee: Rovi Guides, Inc., San Jose, CA (US)

( * ) Notice: Subject to any disclaimer, the term of this patent is extended or adjusted under 35 U.S.C. 154(b) by 43 days.

(21) Appl. No.: 17/534,683

(22) Filed: Nov. 24, 2021

(65) Prior Publication Data
US 2023/0162761 A1    May 25, 2023

(51) Int. Cl.
*G11B 27/00* (2006.01)
*G11B 27/10* (2006.01)
*G11B 27/036* (2006.01)
*G06V 20/40* (2022.01)
*H04N 5/265* (2006.01)
*G10L 25/57* (2013.01)
*G06V 40/16* (2022.01)
*G06F 3/04842* (2022.01)

(52) U.S. Cl.
CPC ............ *G11B 27/036* (2013.01); *G06V 20/44* (2022.01); *G06V 40/161* (2022.01); *G10L 25/57* (2013.01); *G11B 27/10* (2013.01); *H04N 5/265* (2013.01); *G06F 3/04842* (2013.01)

(58) Field of Classification Search
CPC ....... G11B 27/02; G11B 27/029; G11B 27/00; G11B 27/10; H04N 5/265; G06F 3/04842; G06V 40/161; G10L 25/57
USPC ........ 386/270, 280, 282, 284, 286, 290, 248
See application file for complete search history.

(56) References Cited

U.S. PATENT DOCUMENTS

| | | | |
|---|---|---|---|
| 10,008,240 B2 * | 6/2018 | Koide | G11B 27/036 |
| 2020/0066305 A1 * | 2/2020 | Spence | G11B 27/036 |

* cited by examiner

*Primary Examiner* — Daquan Zhao
(74) *Attorney, Agent, or Firm* — Haley Guiliano LLP (57) ABSTRACT

User-generated content is received from multiple user devices, including first content recorded by a first user device during a first time interval and second content recorded by a second user device during a second time interval. If the second time interval immediately precedes, or immediately follows, the first time interval, then at least a portion of the second content may be appended to the first content. For example, if a user ends recording of the first content before an interesting event occurs, then a portion of the second content may be appended to the first content so that the user has a recording including the missed event. The second content may be selected based on a location, and/or a field of view of the second user device during the second time interval being similar to that of the first user device during the first time interval.

16 Claims, 8 Drawing Sheets

METHODS AND SYSTEMS FOR ENHANCING USER-GENERATED CONTENT

FIELD

The present disclosure is directed to methods and systems that can enhance user-generated content. In particular, the present disclosure includes methods and systems for augmenting content generated using a first user device using additional content generated using another user device.

BACKGROUND

It has become commonplace for portable user devices to be used for capturing audio and/or video of events and sights. For example, a user may use their smartphone to record a video of their surroundings, to replay in the future and/or make available to others. However, when capturing real-life, unscripted events, a user will not be aware of an imminent event of interest, and might stop a recording in progress just before the event occurs. For example, a user attending a football game in a stadium might record a portion of the game. An event immediately following the recorded portion of the game would not be included in the user's recording. For instance, if the user were to record a portion of the game where the ball is in play close to their location in the stadium, and stop recording as the play moves away from that location, then the user might miss recording a touchdown that occurs shortly after the recording has stopped. In another example, the user might stop recording the game while waiting for play to restart after a touchdown is scored and miss an event such as an entertaining celebration of the touchdown by the scoring team, or a player waving to them from the field during the break in play.

In a similar manner, the user might be prompted to start recording a portion of the game in response to an occurrence, or start, of an event of interest. Such a recording would necessarily miss at least a part of the event that prompted the user to start recording.

SUMMARY

According to an aspect, there is provided a method comprising: receiving content recorded by a plurality of user devices, the content including first content recorded by a first one of the user devices during a first time interval and second content recorded by a second one of the user devices during a second time interval; determining a first time point, wherein the first time point is a start time of the first time interval or an end time of the first time interval; determining a location of the first user device during at least a portion of the first time interval; determining that the second time interval includes the first time point; determining a location of the second user device during the second time interval; selecting the second content from the content recorded by the plurality of user devices, based on the determination that the second time interval includes the first time point, and based on the determined location of the second user device; and modifying the first content to include at least a portion of the second content.

In this manner, user-generated content from the first user device can be augmented with user-generated content from the second user device immediately preceding, or immediately following the first time interval. Such augmentation effectively extends the first time interval covered by the first content and thus provides a user that has recorded the first content with an enhanced recording.

For example, a plurality of users may use their smartphones, or other user devices, to capture video at locations such as a stadium, arena, or tourist sightseeing spot. The above method allows a video captured by a first user to be augmented by appending at least a portion of a video captured by a second user to the beginning or end of the first user's video, for example, to provide video of an event that was missed by the first user.

Alternatively, or additionally, a portion of the first content may be replaced with at least a portion of the second content. For example, an event during the first time interval might not be captured if the event was not visible in a field of view of the first user device. For example, the first user's view of the event might have been obscured by a person or object in a line of sight between the first user and a location of the event. The method may include replacing, or adding, at least a portion of second content captured by a second user, where the second content includes an unobstructed view of the event.

In some embodiments, the method further comprises detecting an occurrence of an event at a second time point that is not included in the first time interval, and determining that the second content includes a recording of the event. The determination may be based on the second time point, a start time of the second interval, and an end time of the second interval. The determination may be further based on an audio component of the second content and/or a video component of the second content. The detection of the occurrence of the event may include one or more of analyzing an audio component of recorded content including the event, analyzing a video component of recorded content including the event, analyzing keywords in an audio commentary relating to the event, analyzing keywords in social media posts relating to the event, or analyzing keywords in information accessed from a website.

Optionally, selecting the second content may be further based on a location of the second user device during at least a portion of the second time interval, and/or a field of view of the second user device during at least a portion of the second time interval. The field of view of the second user device may be determined based on one or more of: an orientation of the second user device during at least a portion of the second time interval; an angle of the second user device during at least a portion of the second time interval; an elevation of the second user device during at least a portion of the second time interval; or any permutation of these parameters.

In some embodiments, the method may include detecting one or more faces in the second content, wherein modifying, using the control circuitry, a video component of said at least a portion of the second content to obscure the detected one or more faces. Such modifications may be used to preserve privacy of people shown in the second content.

In some embodiments, the second content is selected automatically, based on one or more parameters as discussed above. In other embodiments, the first device may be provided with information associated with recorded content from the plurality of user devices that is determined to include the event, to allow a user of the first device to select the second content. For example, the first device may be provided with images from content recorded by multiple other user devices, to allow the first user to select content recorded by one of the other user devices based, for example, on a viewpoint provided by that content. The second content may then be selected based on input indicating a selection of that content by the first user.

The method may further comprise determining, based on a video component of the second content, that the event is visible in the second content. For example, object recognition may be performed to determine whether a particular event can be seen in the second content, in order to avoid selecting second content in which the event is obscured. Optionally, the determination of whether the event is visible in the second content may take into account both the information determined based on the video component and information indicating a field of view of the second user device. The field of view of the second user device may be determined based on one or more of an orientation, angle, or elevation of the second user device during the second time interval.

In some embodiments, receiving the content recorded by the plurality of user devices comprises identifying, from user-generated content uploaded to a cloud service or social networking platform, content recorded at a geographical location corresponding to the event during a predetermined time period. The content recorded at the geographical location during the predetermined time period may then be obtained from the cloud service or social networking platform.

According to another aspect, there is provided an apparatus configured to perform any of the methods set out in the above aspect. An example of such an apparatus comprises control circuitry, or other means, configured to: receive content recorded by a plurality of user devices, the content including first content recorded by a first one of the user devices during a first time interval and second content recorded by a second one of the user devices during a second time interval; determine a first time point, wherein the first time point is a start time of the first time interval or an end time of the first time interval; determine a location of the first user device during at least a portion of the first time interval; determine that the second time interval includes the first time point; determine a location of the second user device during the second time interval; select the second content from the content recorded by the plurality of user devices, based on the determination that the second time interval includes the first time point, and based on the determined location of the second user device; and modify the first content to include at least a portion of the second content.

The apparatus may further include a cloud server configured to receive uploads of the recorded content from at least some of the plurality of user devices. Such a cloud server may make such recorded content available for inclusion in the first content. For instance, the at least a portion of the second content may be selected from the uploaded content for inclusion in the modified first content.

According to yet another aspect, there is provided a computer program that, when executed by control circuitry, causes the control circuitry to perform any of the methods discussed above. For example, there may be provided a non-transitory computer-readable medium, in which is stored computer-readable instructions including: instructions to receive content recorded by a plurality of user devices, the content including first content recorded by a first one of the user devices during a first time interval and second content recorded by a second one of the user devices during a second time interval; instructions to determine a first time point, wherein the first time point is a start time of the first time interval or an end time of the first time interval; instructions to determine a location of the first user device during at least a portion of the first time interval; instructions to determine that the second time interval includes the first time point; instructions to determine a location of the second user device during the second time interval; instructions to select the second content from the content recorded by the plurality of user devices, based on the determination that the second time interval includes the first time point, and based on the determined location of the second user device; and instructions to modify the first content to include at least a portion of the second content.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems according to the present disclosure allow content generated using a first user device to be augmented using content generated using a second user device. In the exemplary embodiments set out below, video captured by a first user device is augmented using video captured by a second user device. In other embodiments, such methods and systems may be used to augment content other than captured video, such as audio content or other multimedia content generated or captured by the first user device.

Figure 1A:
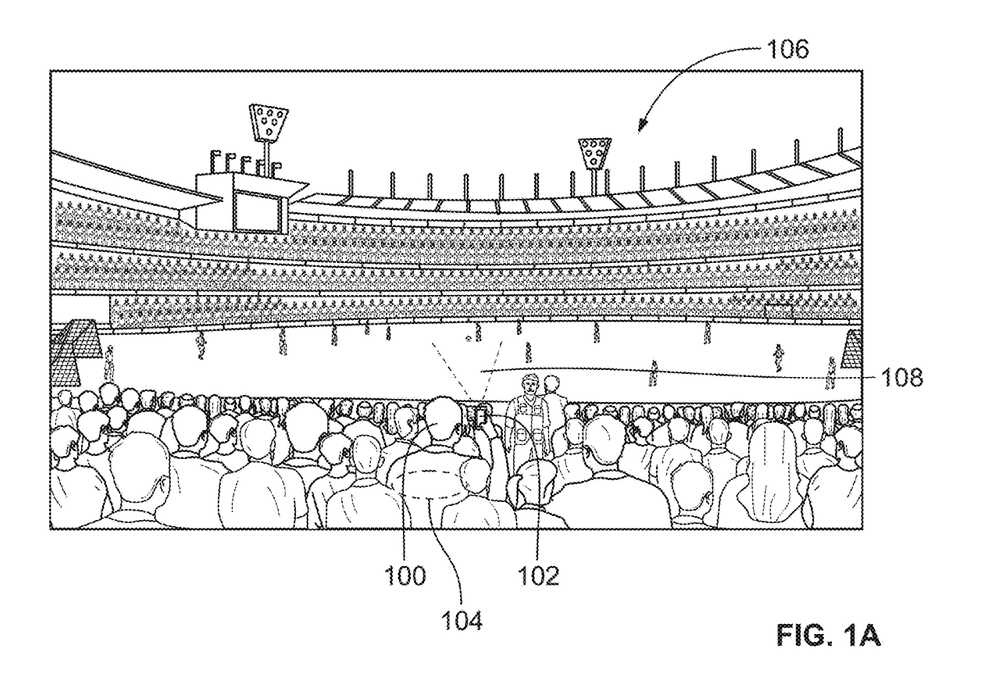
FIGS. 1A and 1B depict a scenario in which a user device creates content according to an embodiment.
Figure 1B:
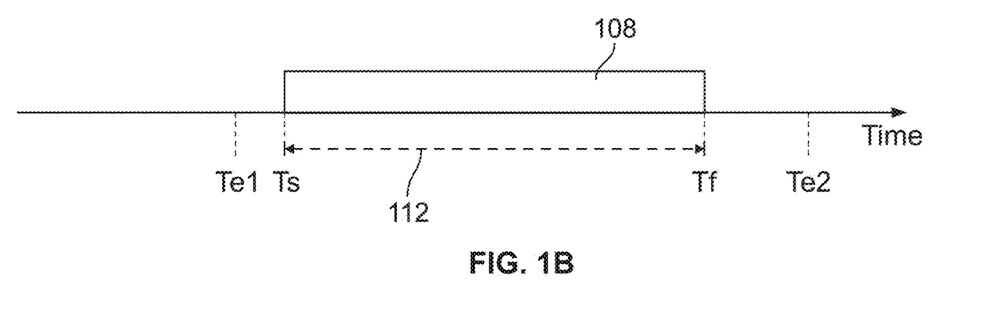

FIGS. 1A and 1B depict a scenario in which a first user 100 is generating content by capturing video using a first user device 102. In this particular example, the first user device 102 is a smartphone, and the first user 100 is making a video recording 108 of a cricket match from their location 104 within a sports stadium 106. The recording 108 covers a field of view 110 during a particular time interval 112 between a start time Ts and a finish time Tf, shown in FIG. 1B. For example, the recording 108 may capture action in the match between Ts and Tf and/or images of other attendees in the stadium 106, such as friends and family members of the first user 100, but will not capture events occurring outside the time interval 112, such as an event occurring at time Te1 or Te2.

At a site such as sports stadium 106, it is almost inevitable that video will be captured by other attendees. For example, the sports stadium 106 may have a capacity of 50,000 people and is full. If each attendee captures an average of 2 videos each, then 100,000 videos may be captured over the course of the soccer game, so it is likely that another user will have captured video of the event missed by the first user at time Te1 or Te2, albeit with different fields of view when compared with the recording 108, due to differences in the locations of the first user 100 and other users and, potentially, differences in orientation and elevation of the first user device 102 compared with user devices of the other users.

Figure 2A:
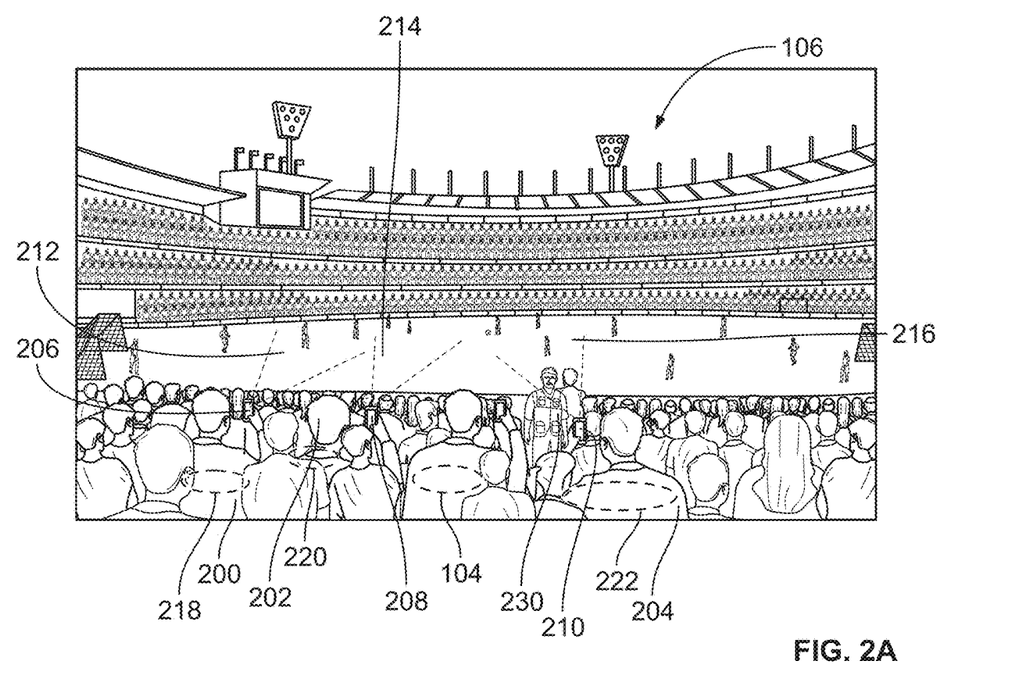
FIGS. 2A and 2B depict the creation of content by other user devices in the scenario shown in FIGS. 1A and 1B.
Figure 2B:
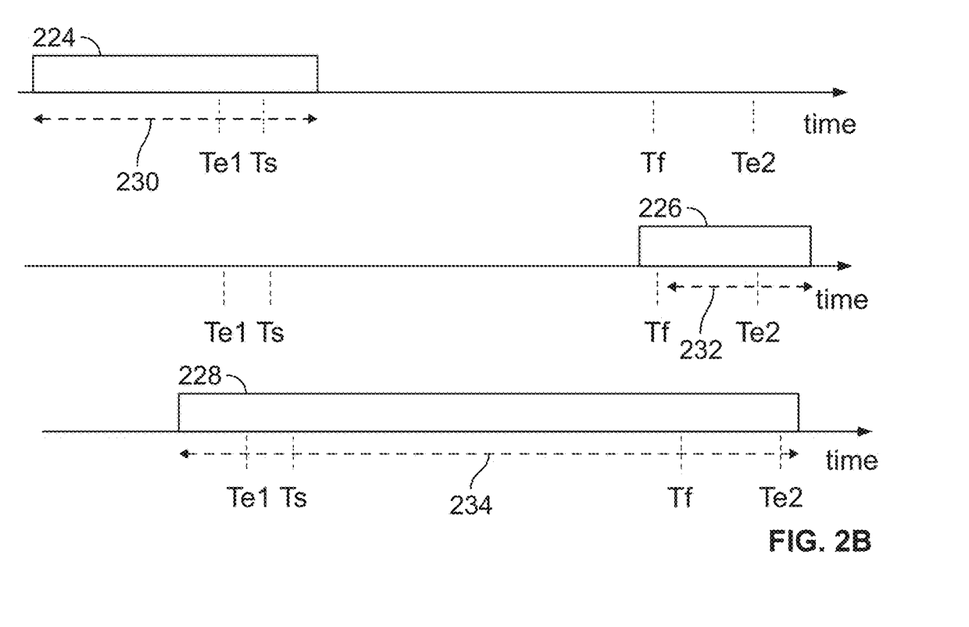

FIGS. 2A and 2B depict examples of other users 200, 202, 204 capturing video using respective user devices 206, 208, 210, with respective fields of view 212, 214, 216 from locations 218, 220, 222 in the vicinity of the location 104 of the first user 100. Their captured videos may include respective second recordings 224, 226, 228 during time intervals 230, 232, 234 that at least partially overlap, or even encompass, time interval 112, as shown in FIG. 2B. By appending at least a portion of one of the second recordings 224, 226, 228 to the first recording 108, the first user 100 can be provided with an augmented recording that includes one or more of the missed events.

FIGS. 3A-3D depict examples of how the first recording 108 can be augmented by appending some or all of the second recordings 224, 226, 228 to the first recording 108. In the example shown in FIG. 3A, at least a portion 224' of second recording 224 is prepended to the first recording 108 to provide a modified recording 300 that includes video of the event occurring at time Te1 captured by the second user device 206.

Figure 3A:
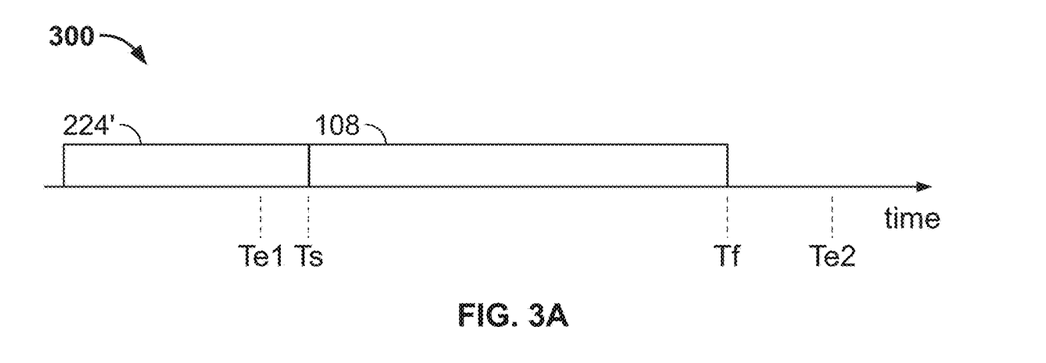
FIGS. 3A-3D depict examples of modification of the content created by a user device in accordance with various embodiments.
Figure 3B:
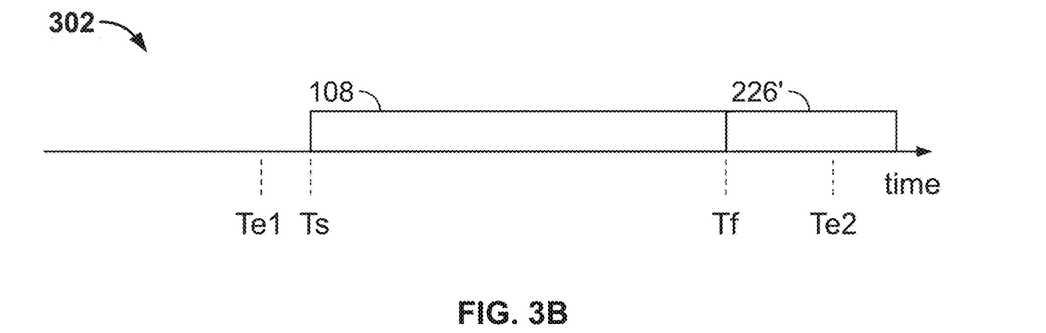

In the example shown in FIG. 3B, at least a portion 226' of the second recording 226 is appended to the first recording 108 to provide a modified first recording 302 that includes video of the event occurring at time Te2 captured by the second user device 208.

Figure 3C:
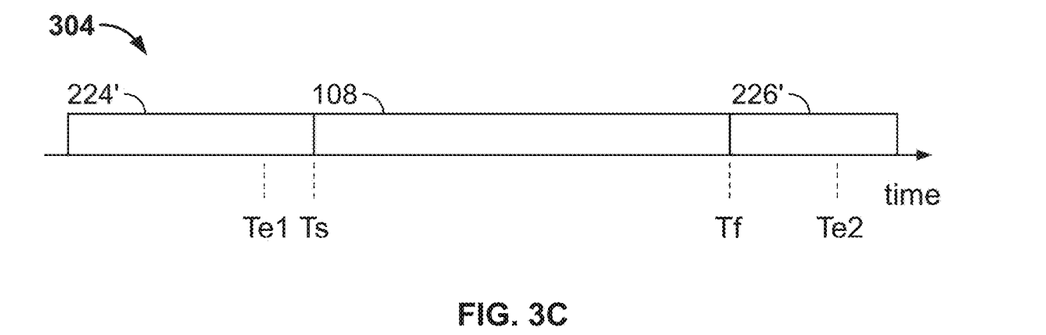

In the example shown in FIG. 3C, a portion 224' of second recording 224 is prepended to the first recording 108, and a portion 226' of the second recording 228 is appended to the first recording 108 to provide a modified first recording 304 that includes the events occurring at times Te1 and Te2.

Figure 3D:
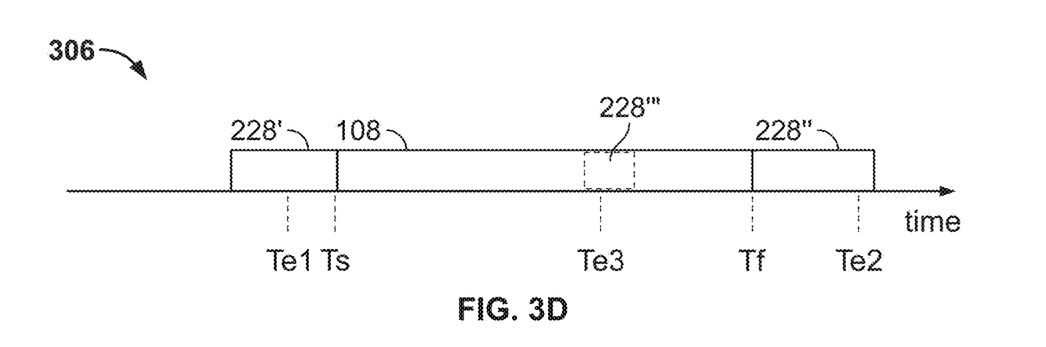

In another example, shown in FIG. 3D, a modified first recording 306 that includes both of the events is obtained by prepending and appending portions 228', 228" of the same recording, such as second recording 228 captured by the other second user device 210, which covers a time interval 234 encompassing the first time interval 112.

In some embodiments, a portion of the first recording may even be replaced with at least a portion of a second recording. For example, the modified first recording 306 of FIG. 3D may also include a portion 228'" of the second recording 228 that was recorded during the first time interval 112. A portion of the first recording 108 during the first time interval 112 may be replaced by such a portion 228'" if, for example, the first recording 108 covered a time Te3 at which an event occurred but did not show a clear view of the event. If the field of view 110 of the first user device 102 was partially obscured during the time Te3 of the event, then the modified first recording 306 may include the portion 228'" of a second recording 228 that provides a better, or even an unobscured, view of the event at time Te3, in place of the corresponding portion of the first recording 108.

Figure 4:
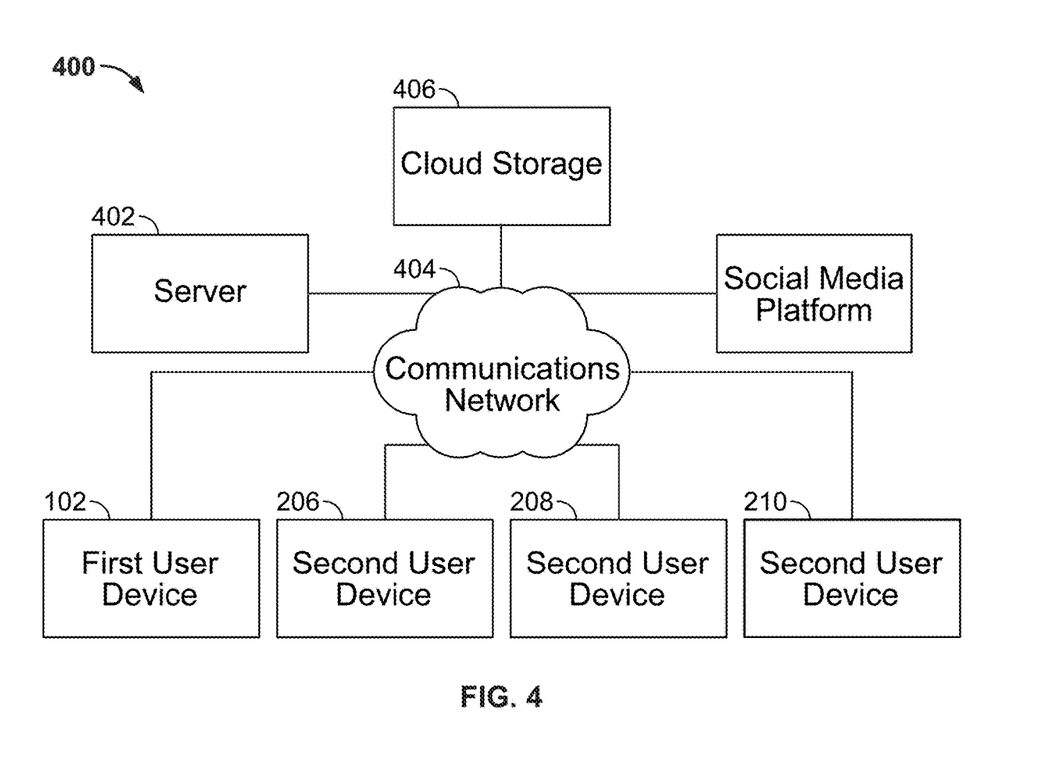
FIG. 4 depicts a system according to an embodiment.

FIG. 4 depicts a system 400 for augmenting user-generated content according to an embodiment. The system comprises a server 402, which can communicate with the user devices 102, 206, 208, 210 via a communication network 404. Optionally, the server 402 may also communicate with a cloud storage server 406, such as Google Photos™ or Apple iCloud™ and/or a social media platform server 408, via the communication network 404. Google Photos™ is a trademark owned by Google LLC. iCloud™ is a trademark owned by Apple Inc.

Although only one communication network 404 is shown in the example of FIG., in other embodiments, the first and second user devices 102, 206, 208, 210 may communicate with the server 402, cloud storage server 406, and/or social media platform 408 via one or more first communication networks 404. For example, the user devices 102, 206, 208, 210 may transmit recordings 108, 224, 226, 228 to one or more of the server 402, cloud storage server 406, or social media platform 408 via a communication network 404, such as the Internet or the "Internet of Things," which may be accessed via a cellphone network or local area network, not shown.

For example, the communication network 404 may be a local area network, such as a local Wi-Fi network. The server 402 may be a server that is provided in association with the site, such a server 402 associated with the stadium 106, that allows the users 100, 200, 202, 204 to upload videos over the local area network. In this manner, a video augmentation service may be provided by the promotor, team or owner of the stadium 106 as a service to spectators at the game, using the uploaded videos. The service may be accessed via a webpage inviting a user 100, 200, 202, 204 to upload videos, for example, in exchange for the opportunity to have their own videos augmented by other users' content. Alternatively, or additionally, another user incentive, such as a voucher, gift, or monetary compensation, may be offered to encourage the users 100, 200, 202, 204 to make their recordings 108, 224, 226, 228 available to the augmentation service.

Alternatively, or additionally, the server 402 may source videos 108, 224, 226, 228 uploaded by the users 100, 200, 202, 204 from the cloud storage server 406, and/or posts by those users 100, 200, 202, 204 on the social media platform 408.

Figure 5:
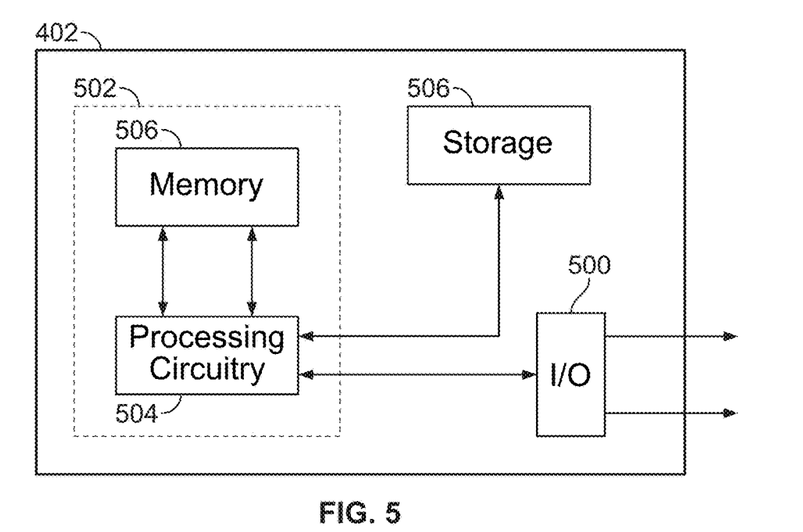
FIG. 5 depicts a server according to an embodiment.

FIG. 5 is a block diagram of the server 402. The server 402 is configured to transmit and receive content and data via I/O path 500. In particular, the I/O path 500 may receive recordings 108, 224, 226, 228 from one or more of the user devices 100, 206, 208, 210, the cloud storage server 406, and the social media platform 408, and may provide a modified video 300, 302, 304, 306 to the first user device 102 via the communication network 404, shown in FIG. 4.

The server 402 includes control circuitry 502. The control circuitry 402 includes processing circuitry 504, and memory 506 (e.g., RAM, ROM, hard disk, removable disk, etc.). The control circuitry 502 may be used to send and receive requests, and other data, using I/O path 500.

The control circuitry 502 may include any suitable processing circuitry 504, such as circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The control circuitry 502 executes instructions for an application stored in the memory 506. Specifically, the control circuitry 502 may be instructed by applications to perform functions to prepend or append at least a portion 224', 226', 228', 228" of a selected recording 224, 226, 228 to the first recording 108.

The control circuitry 502 includes communications circuitry suitable for communicating with the communication network 404, cloud storage server 406 and social media platform 408. The communications circuitry may include a cable modem, an integrated services digital network (ISDN) modem, a digital subscriber line (DSL) modem, a telephone modem, Ethernet card, or a wireless modem for communications with other equipment, or any other suitable communications circuitry via the communication network 404.

Additional storage 508 may be included, for example, for storing recordings 108, 224, 226, 228 uploaded by the users 100, 200, 202, 204, and/or data relating to those recordings 108, 224, 226, 228. As referred to herein, the phrase "storage" should be understood to mean any device for storing electronic data, computer software, or firmware, such as random-access memory, read-only memory, hard drives, optical drives, or any other suitable fixed or removable storage devices, and/or any combination of the same.

Figure 6:
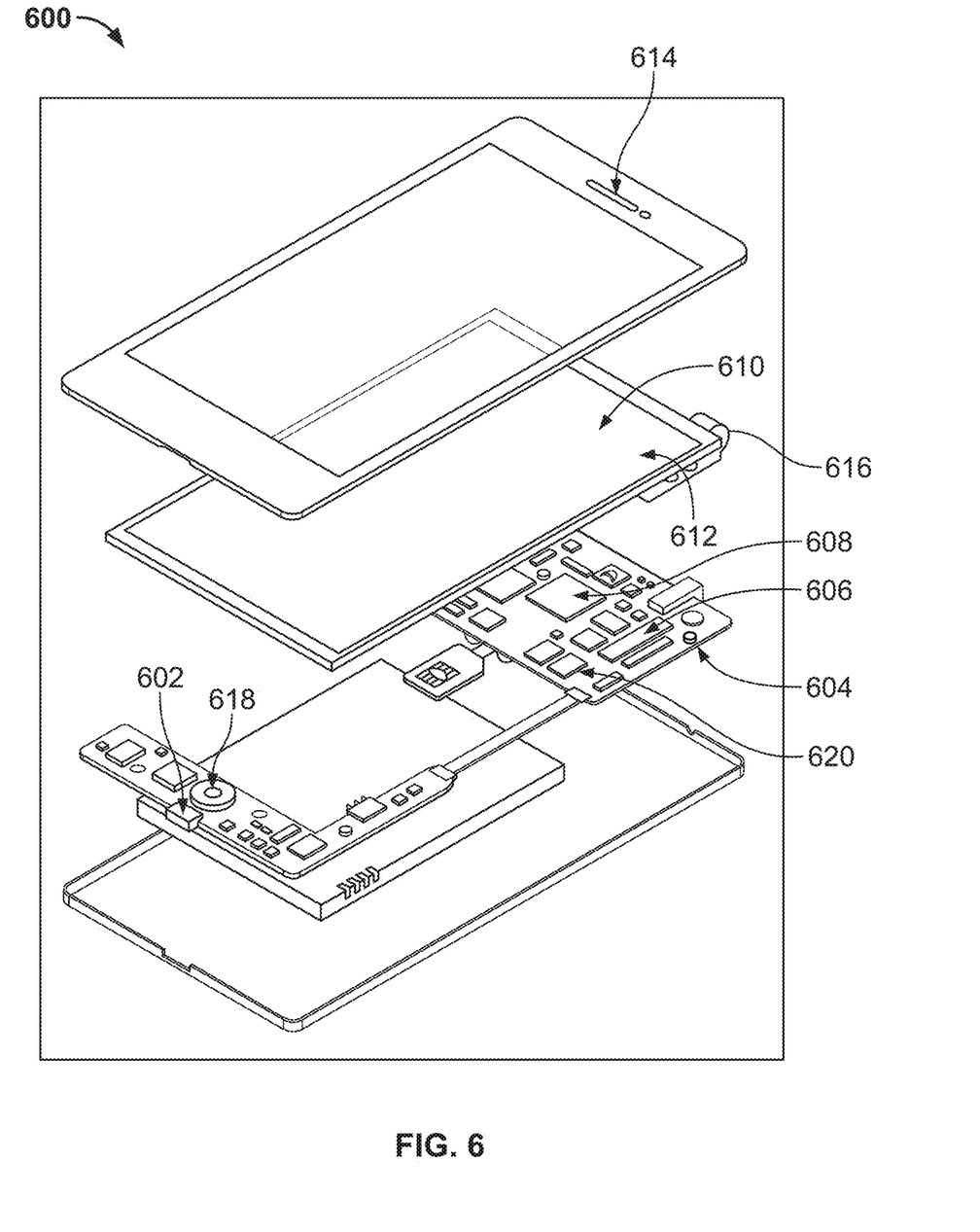
FIG. 6 depicts a user device that may be included in the system of FIG. 4.

FIG. 6 depicts an exemplary user device 600 that may be used as the first user device 102, and/or one or more of the second user devices 206, 208, 210. As discussed above, in this example, the user device 600 is a smartphone. In other embodiments, the user device 600 may be another type of portable user device capable of recording content, such as a tablet, or a wearable device.

The user device 600 is configured to receive content and data via second input/output (I/O) path 602. Second I/O path 602 may provide content (e.g., one or more of broadcast programming, on-demand programming, Internet content, content available over a local area network (LAN) or wide area network (WAN), and/or other content) and data to the second control circuitry 604, which includes second processing circuitry 606 and second storage 608. The second control circuitry 604 may be used to send and receive commands, requests, and other suitable data using the second I/O path 602. The second I/O path 602 may connect the second control circuitry 604, and, specifically, the second processing circuitry 606, to one or more communication networks, such as the communication network 404 shown in FIG. 4. I/O functions may be provided via one or more of these communication paths, but are shown as a single path in FIG. 6 to avoid overcomplicating the drawing.

The second control circuitry 604 may include any suitable processing circuitry 606, such as the examples discussed above in relation to the processing circuitry 504 of the server 402. The second control circuitry 604 executes instructions for an application stored in the second storage 608. For example, applications may provide instructions to the second control circuitry 604 to generate displays. In some implementations, any action performed by the second control circuitry 604 may be based on instructions received from the applications.

The second control circuitry 604 includes second communications circuitry suitable for communicating with an application server, networks or servers. In a client-server arrangement, the instructions for carrying out the above-mentioned functionality may be stored on an application server. The communications circuitry may include a cable modem, an integrated services digital network (ISDN) modem, a digital subscriber line (DSL) modem, a telephone modem, Ethernet card, or a wireless modem for communications with other equipment, or any other suitable communications circuitry via one or more communication networks. In addition, the second communications circuitry may include circuitry that enables peer-to-peer communication with other user devices.

The second control circuitry 604 may include video generating circuitry, one or more MPEG-2 decoders or other digital decoding circuitry, or any other suitable video circuits or combinations of such circuits. Encoding circuitry (e.g., for converting analog, or digital signals to MPEG signals for storage) may also be provided. The second control circuitry 604 may also include scaler circuitry for upconverting and downconverting content into the preferred output format of the user device 600. The circuitry described herein, including for example, the video generating, encoding, decoding, encrypting, decrypting, scaler, and analog/digital circuitry, may be implemented using software running on one or more general purpose or specialized processors.

A user may send instructions to the second control circuitry 604 using a user input interface 610. The user input interface 610 may be any suitable user interface, such as a remote control, mouse, trackball, keypad, keyboard, touchscreen, touchpad, stylus input, joystick, voice recognition interface, or other user input interfaces. In this particular example, a display 612 is integrated with other elements of the user device 600 and may be a touch-screen or touch-sensitive display. In such circumstances, the user input interface 610 is integrated with or combined with the display 612. Display 612 may any suitable display, such as a liquid crystal display (LCD), electronic ink display, light-emitting diode display, organic light-emitting diode display, or any other suitable equipment for displaying visual images. In some embodiments, the display 612 may be HDTV-capable. In some embodiments, display 612 may be a 3D display, and the interactive application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to the second control circuitry 604. The video card may be integrated with the second control circuitry 604. Speakers 614 may be provided as integrated with other elements of the user equipment device 600. The audio component of videos and other content displayed on display 612 may be output through the speakers 614.

The applications may be stand-alone applications implemented on the user devices 600. For example, the application may be implemented as software or a set of executable instructions which may be stored in the second storage 608 and executed by the second control circuitry 604.

In some embodiments, the applications may be client-server applications where a client application resides on the user equipment device, and a server application resides on a remote server. For example, applications may be implemented partially as a client application on the second control circuitry 604 and partially on a remote server as a server application running on the control circuitry 502 of the server 402. When executed by the control circuitry 502 of the server 402, the application may instruct the control circuitry 502 to generate application displays and transmit the generated displays to the user equipment device 600. The server application may instruct the control circuitry 502 to transmit data for storage on the user device 600. The client application may instruct the second control circuitry 604 of the user equipment 600 to generate the application displays.

The user device 600 also includes a camera 616 for capturing still images and video and a microphone 618 for capturing audio input.

In addition, the user device 600 includes additional sensors 620, including one or more of a compass, an accelerometer, and a Global Positioning Service (GPS) sensor. The output from the sensors 620 is used, by the second control circuitry 604, to determine data such as one or more of a location of the user device 600, an orientation of the user device 600, or an elevation of the user device 600. That data may then be linked to a recording made by the user device 600, such as the recordings 108, 224, 226, 228 made by user devices 102, 206, 208, 210, for example, as metadata included in, or otherwise associated with the recordings 108, 224, 226, 228, or otherwise transmitted to the server 402 in conjunction with the recordings 108, 224, 226, 228.

Figure 7:
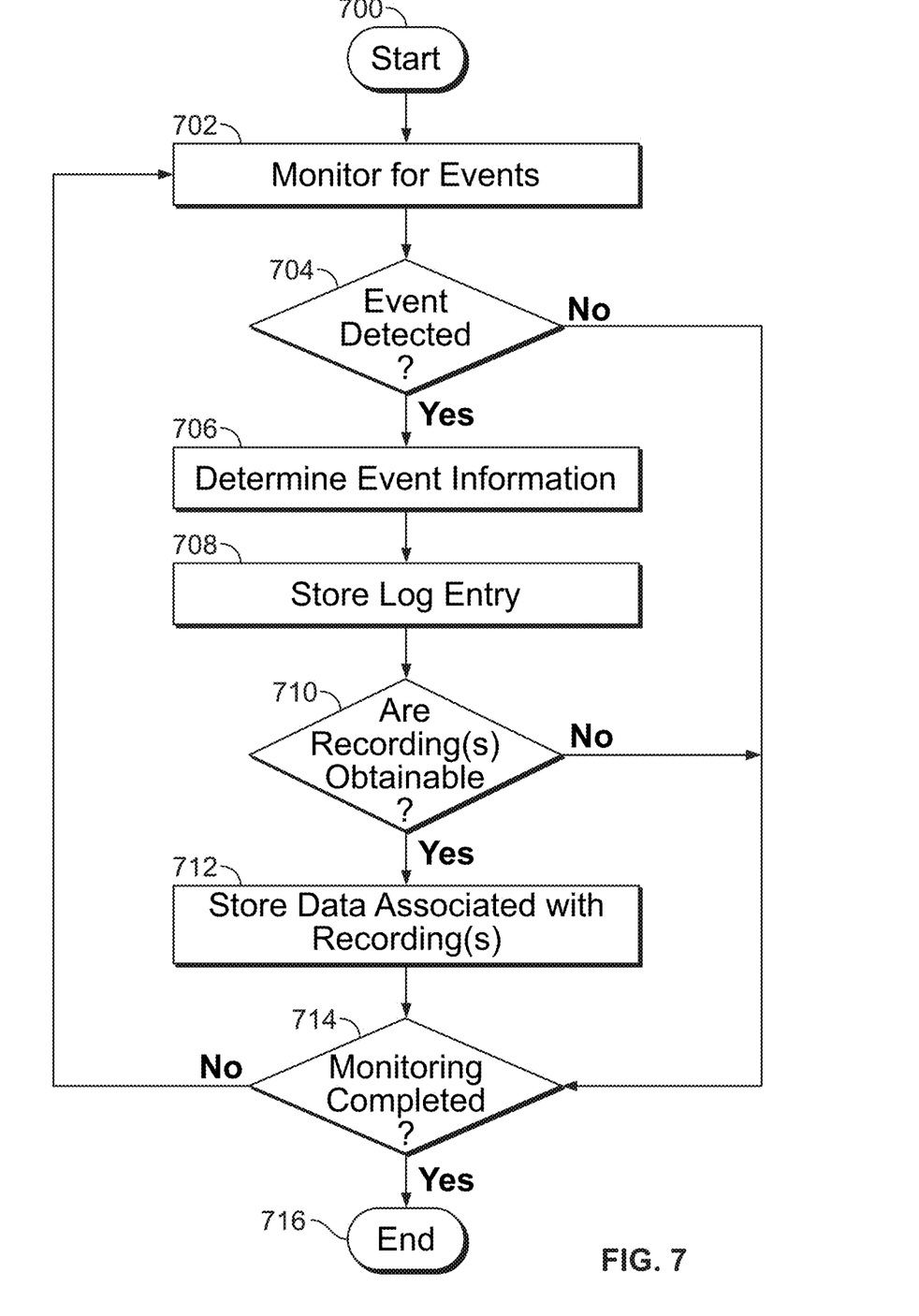
FIG. 7 is a flowchart of a method of collecting user-generated content that may be performed by the server of FIG. 5 in accordance with an embodiment.

FIG. 7 is a flowchart of a method of collecting user-generated content for use in augmenting user-generated content that may be performed by the server 402, in accordance with an embodiment. Starting at 700, the control circuitry 502 begins monitoring for events (step 702). In the specific example shown in FIG. 1, events within the soccer game may be detected, for instance through manual input, detection of score changes, analysis of audio or video captured within the stadium, or analysis of audio or textual commentary. Examples of events may include goals, penalty kicks, a player being sent off, a player being substituted, etc. The monitoring may begin at the start of the game. Alternatively, the monitoring may begin prior to the start of the game, for example, to detect pre-game events such as incidents during player warm-up sessions, pre-game entertainment, and so on, and/or may continue after the game has finished to detect post-game events such as a trophy presentation.

If an event is detected (step 704), then the control circuitry 502 determines information about the event (step 706). The information includes a time at which the event occurred. Optionally, the information may further include a location within the stadium, and/or a type of the event. The determination may be based on one or more of a manual input, time of detection of a score change, captured audio, captured video, audio or textual commentary.

The control circuitry 502 then stores a log entry indicating the event, for example, in the storage 508 (step 708). For each event, the log entry indicates a time of the event and, optionally, a location within the stadium and/or type of event. In this manner, a timeline of events in the soccer game may be compiled by the server 402.

The server 402 then determines whether one or more recordings 108, 224, 226, 228 of at least part of the game are obtainable (step 710). In this particular example, the recordings 108, 224, 226, 228 are videos uploaded by the user devices 102, 206, 208, 210 to the server 402 and stored in the storage 508 while the game is in progress. In other examples, the recordings may be videos uploaded to the server 402, to the cloud storage server 406, or to the social media platform 408 during the game and/or, optionally, after, the game.

The server 402 then stores data associated with the recordings 108, 224, 226, 228 (step 712) to indicate the time interval 112, 230, 232, 234 covered by the recording 108, 224, 226, 228, such as the start and end times Ts, Tf of the recording 108, 224, 226, 228. The data may, optionally, also include one or more of an angle, direction, in-stadium location 104, 218, 220, 222, and elevation of the respective user device 102, 206, 208, 210 that captured the recording 108, 224, 226, 228, as indicated by data provided by that user device 102, 206, 208, 210. Multiple instances of an angle, direction, location 104, 218, 220, 222, and elevation may be stored for a particular recording 108, 224, 226, 228 to reflect any changes in the position of the respective user device 102, 206, 208, 210 and/or its field of view during the time interval 112, 230, 232, 234 covered by the recording 108, 224, 226, 228. In this manner, a database of recordings 108, 224, 226, 228 may be compiled by the server 402, with information that can be used to determine whether the recordings 108, 224, 226, 228 potentially include one or more of the detected events.

These processes of monitoring and logging events (steps 702-708) and compiling the database of recordings (steps 710-712) continue until it is determined that they are complete (steps 714, 716). The process of monitoring and logging events (steps 702-708) may continue until the game has finished, or until post-game activity on the pitch has been completed (step 714). The process of compiling the database of recordings (steps 710-712) may been deemed complete at the same time that the monitoring finishes (step 716) or, optionally, may continue until a later time. For example, the database may continue to be compiled for a set number of hours, days, or weeks, to allow for users uploading recordings after the end of the game. The process then ends at 718.

Figure 8:
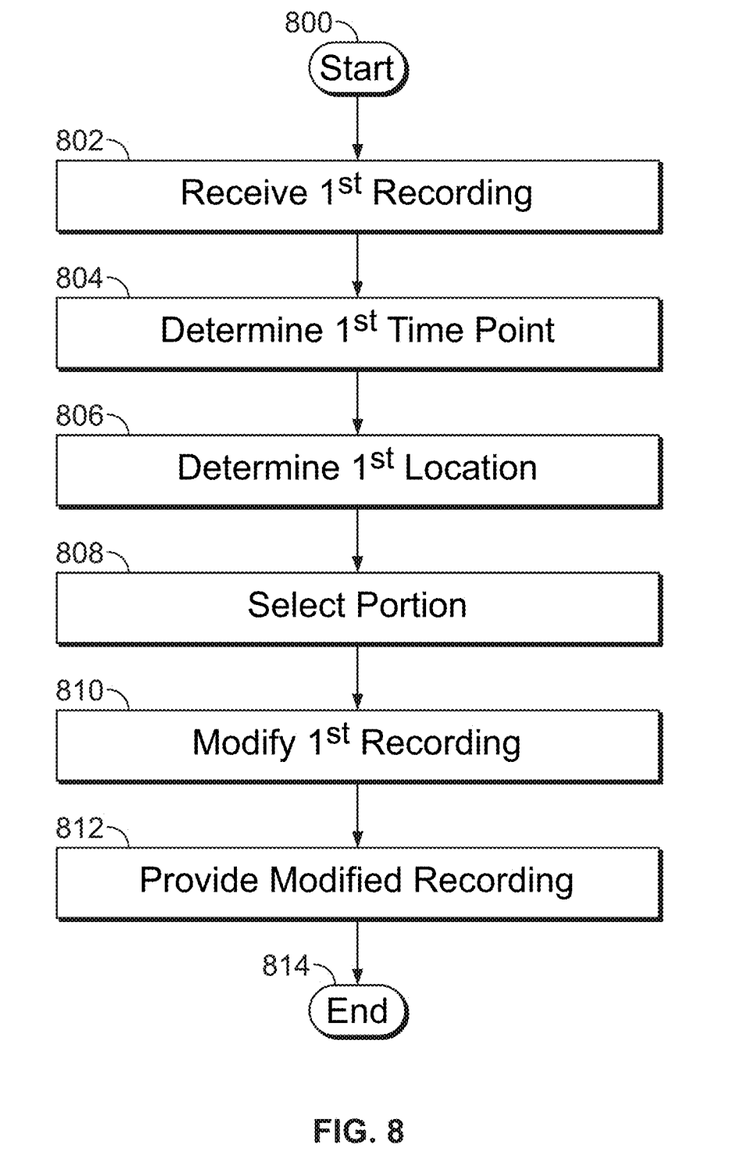
FIG. 8 is a flowchart of a method to augment user-generated content performed by the server of FIG. 5 in accordance with an embodiment.

FIG. 8 is a flowchart of a process to augment user-generated content performed by the server 402 of FIG. 5, in accordance with an embodiment. This process may be performed in parallel with the process of FIG. 7, for example, in conjunction with determining that a recording 108 from the first user device 102 has been uploaded (step 710) and storing the data associated with the recording (step 712). Alternatively, or additionally, this process may be performed if the recording 108 is uploaded after the process of FIG. 7 has been completed.

Starting at 800, the control circuitry 502 of the server 402 receives, or otherwise obtains, the first recording 108 (step 802). For example, the first user device 102 may have uploaded the first recording 108 to the server 402. This step may coincide with the determination at step 710 in FIG. 7.

The control circuitry 502 then determines a first time point associated with the first recording 108 (step 804). For example, the first time point may be the start time Ts or the end time Tf of the time interval 112 covered by the first recording 108. This determination may be based on the data associated with the first recording 108, as discussed above in relation to step 712 of FIG. 7.

The control circuitry 502 also determines a location associated with the first recording 108 (step 806). This determination may be based on the data associated with the first recording 108, as discussed above in relation to step 712 of FIG. 7, such as GPS data. Step 806 may, optionally, further include determining the field of view 110 of the first user device 102 during the first time interval 112. The field of view 110 may be determined based on one or more of an orientation, elevation, or angle of the first user device 102 during the first time interval 112.

The control circuitry 502 then selects at least a portion of a second recording 224, 226, 228 to prepend or append to the first recording 108 (step 808). The selection will depend on the second time interval 230, 232, 234 covered by the second recording 224, 226, 228 including the first time point. For example, if the first recording 108 is to be augmented by adding video of the event that occurred at time Te1, prior to the start time Ts of the first recording 108, then a portion of a second recording 224, 226, 228 may be selected that includes a time point corresponding to the start time Ts and a second time point corresponding to time Te1. Similarly, if the first recording 108 is to be augmented by adding video of the event at time Te2, after the finish time Tf of the first recording 108, then a portion of a second recording 224, 226, 228 may be selected that includes a time point corresponding to the end time Tf of the first recording 108 and a time point corresponding to the time Te2.

The selection of the portion of the second recording 224, 226, 228 at step 808 may also be based on a location of the respective second user device 206, 208, 210 during the second time interval 230, 232, 234, as indicated in the data stored at step 712 of FIG. 7. For example, the control circuitry 502 may select a portion 228' from the second recording 228 made by the second user device 210 instead of a portion 224' from the second recording 224 made by the second user device 206, based on the location 222 of the second user device 210 during the second time interval 234 being closer to the location 104 of the first user device 102, when compared with the location 218 of the second user device 206 during the respective second time interval 230, as shown in FIG. 2A.

The selection of the portion of the second recording 224, 226, 228 at step 808 may optionally take into account the respective fields of view 212, 214, 216 of the second user devices 206, 208, 210. This data may be used to exclude a second recording 224, 226, 228 that does not include the event. For example, a second user located close to the first user 100 may have uploaded video recorded during the time Te1, Te2 the event occurred but might have been capturing video of their friends or family, instead of capturing video of the event on the field. Elevation, orientation, and/or angle data for the second user devices 206, 208, 210 may be utilized in order to select the second recording 224, 226, 228 for which the field of view 212, 214, 216 provides the closest match to the field of view 110 of the first user device 102. These determinations may be based on the data stored in step 712 of FIG. 7 for the recordings 108, 224, 226, 228.

Optionally, the selection of the portion of the second recording at step 808 may also include performing object recognition on at least a portion of one or more candidate second recordings 224, 226, 228, or analyzing object recognition data obtained previously, to determine whether or not the event is visible in the second recordings 224, 226, 228. In the example shown in FIGS. 1A and 2A, at least part of the field of view 110 of the first user device 102 is obscured from the view 216 of one of the second user devices 210 due to people 230 standing between the respective second user 204 and the part of the pitch. The obscuration of the event may be detected by the absence of an associated object, such as a soccer ball associated with a goal event. In this example, even though, of the second user locations 218, 220, 222, the location 222 of the second user 204 might be the closest to the location 104 of the first user 100, the control circuitry 502 may instead select a portion 226' of the recording 226 made by another of the second users 202 because it provides an unobscured view of the event.

The control circuitry 502 then modifies the first recording 108, by prepending or appending the selected portion 224', 226', 228', 228" to the first recording 108 as appropriate (step 810). In some embodiments, the entirety of a selected second recording may be added to the first recording 108.

Optionally, the modification at step 810 may include producing or obtaining an edited version of the selected portion for addition to the first recording 108. In particular, the selected portion 224', 226', 228', 228" may be edited to blur or mask faces in the selected portion in order to preserve the privacy of people shown in the relevant second recording 224, 226, 228.

The control circuitry 502 then provides the modified first recording 300, 302, 304 to the first user device 102 (step 812). For example, the control circuitry 502 may transmit the modified first recording 300, 302, 304 to the first user device 100 via the communication network 404. In another example, the control circuitry 502 may send to the first user 100 a link, such as a Uniform Resource Locator (URL) address that may be used to access the modified first recording 300, 302, 304. Such an address or link may be sent to the first user 102 in an e-mail, chat message, text message or other message. The process then ends at 814.

While the process of FIG. 8 has been described in conjunction with the process of FIG. 7, in another embodiment, the process of FIG. 8 may be performed independently of the process of FIG. 7. For example, the process of FIG. 8 may be performed in response to receipt of a request from the first user 100 to augment the first recording 108 by adding video before and/or after the first time interval 112 that is not related to a detected event in the game. For instance, if the first user 100 stopped capturing video just before a player in the game waved at them, then the first user 100 might wish to append, to the first recording 108, video of the player waving, and may request such video from the server 402, regardless of whether or not event monitoring, as described in relation to step 702 of FIG. 7, has been performed.

In either of the methods described above with reference to FIG. 8, the selection of the portion at step 808 may be based on a selection received from the first user device 102. A method for such a selection will now be described with reference to FIGS. 9 and 10.

Figure 9:
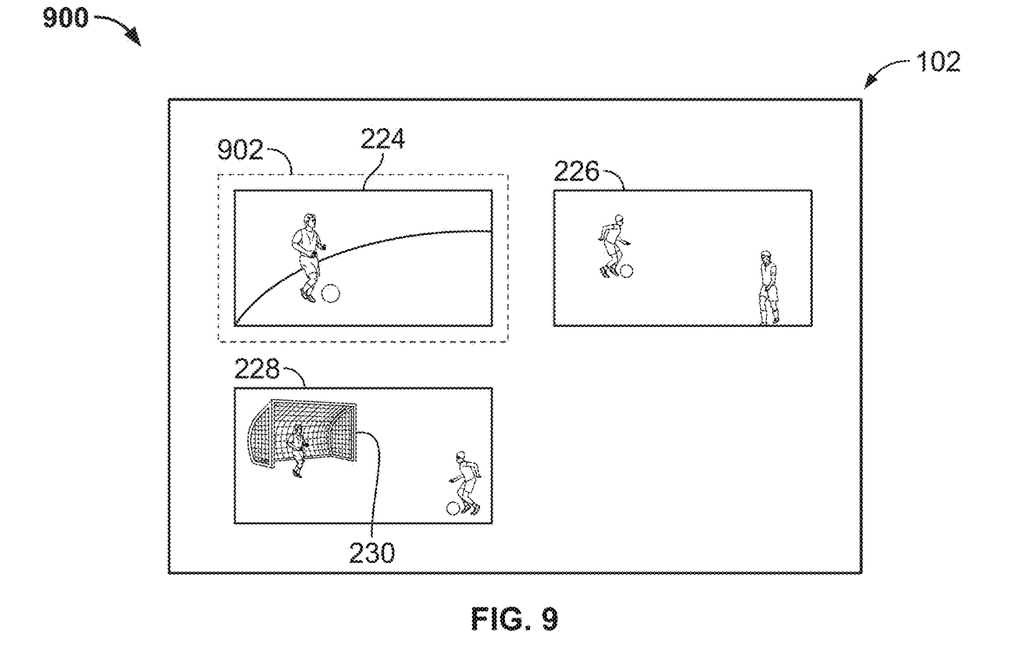
FIG. 9 depicts a display screen that may be displayed by a user device during performance of the method of FIG. 8.

FIG. 9 depicts an example display screen 900 in which such images from candidate second recordings 224, 226, 228 are presented on the display of the first user device 102 to allow the first user 100 to make such a selection.

Figure 10:
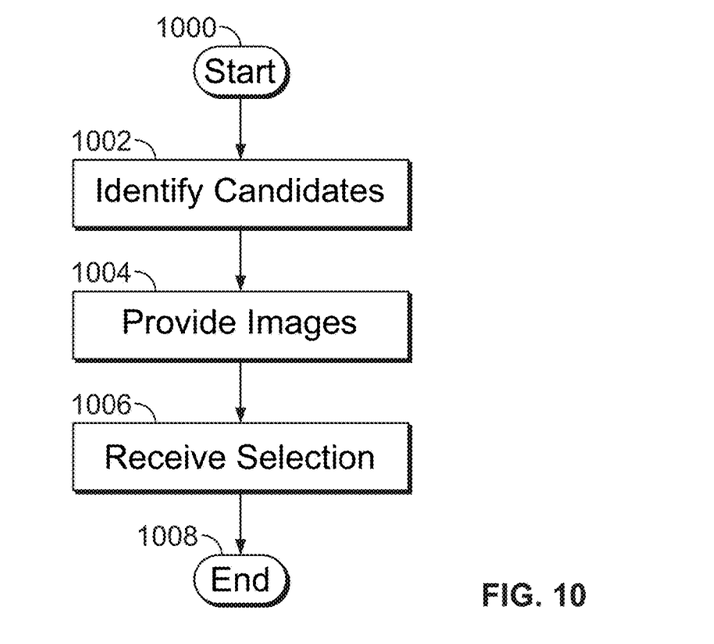
FIG. 10 is a flowchart of a method that may be included in the method of FIG. 8.

Referring now to FIG. 10, starting at 1000, the control circuitry 502 of the server identifies candidate recordings 224, 226, 228 for providing a portion to augment the first recording 108 (step 1002). The control circuitry 502 may identify the candidate second recordings 224, 226, 228 by filtering the second recordings 224, 226, 228 based on respective time interval information and respective location information, such as the data stored at step 712 in the method of FIG. 7. The respective time intervals 230, 232, 234 may be compared with a desired time interval or time point that is based on a request received from the first user device 102 or on the start and/or end times Ts, Tf of the first interval 112.

At step 1004, the control circuitry 502 provides still or video images from the candidate second recordings 224, 226, 228 to the first user device 102. The provided images may be presented on the display of the first user device 102, for example, in the display screen 900 shown in FIG. 9. The first user 100 can select one of the second recordings 224, 226, 228, via a user input interface. For example, the first user may position a highlight region 902 over a corresponding image and confirm selection of that image using touch-screen and/or cursor input. An indication of that user selection is then transmitted by the first user device 102 to the server 402.

The control circuitry 502 then receives the indication of the user selection at step 1006, completing the selection of the portion at 1008. The control circuitry 502 then proceeds to modify the first recording 108, as described above in relation to step 810 of FIG. 8.

Basing the selection of the portion, at least in part, on such a user selection can provide greater reliability in the selection of a suitable portion 224', 226', 228', 228" of a second recording 224, 226, 228. For instance, the first user 100 wishes to add video that might not correspond to an event in the soccer game. In the example discussed above, where a player waved to the first user 100, the player's wave is unlikely to have been detected and logged as an event by the server 402 and, therefore, allowing the user 100 to select a portion 224', 226', 228', 228" of a second recording 224, 226, 228 that meets their requirements can result in greater reliability.

Similarly, a process involving such a user selection may avoid the selection of a portion in which an event is obscured, for example, by the people 230 shown in the second recording 228, without needing to perform, or rely on, an object recognition process as described above in relation to step 808 of FIG. 8.

The above disclosure is meant to be exemplary and not limiting. As discussed above, the disclosure is not limited to augmenting captured video. The disclosed methods and systems may, instead, be used to augment other types of content, including audio content, or multimedia content other than live video recordings. Only the claims that follow are meant to set bounds as to what the present invention includes.

For example, although embodiments have been described with reference to a particular type of location, namely a sports stadium, the methods and systems may be applied to content relating to other types of locations, such as other types of area, sites such as tourist sights, safari locations, and so on.

While the above example related to a sports event, in which recordings were uploaded to a server associated with a stadium during a game, the methods and systems may be used to provide a content augmentation service at a later time. For example, users may be permitted to upload videos to a content augmentation server via the Internet at any time after an event.

The above-described embodiments related to a system in which a server 402 determines whether to prepend or append video to a first recording 108. In other embodiments, the user devices 102, 206, 208, 210 may be arranged to share recordings 108, 224, 226, 228. In such an embodiments, the first user device 102 may be configured to determine whether to augment the recording 108 using a portion of a shared recording 224, 226, 228 and/or to prepend or append such a portion to the first recording 108. Optionally, such a determination may be based on information regarding detected events received from a server 402.

In many of the above-described embodiments, a first recording 108 is augmented by prepending or appending at least a portion of a second recording 224, 226, 228. In other embodiments, a portion of the first recording 108 may be replaced by at least a portion of a second recording 224, 226, 228. For example, it may be determined that one of the second recordings 224, 226, 228 includes a better view of an event that occurred during the first time interval. As discussed above, one user's view of an event may be obstructed by people or objects between that user and the event. An object recognition process, such as that described above in relation to step 808 of FIG. 8 may be used to determine whether the first recording 108 includes an obstructed view of an event. In response to a determination that the first recording 108 includes such an obstructed view, a portion of the first recording 108 including a time at which the event occurred may be replaced with a portion of a second recording 224, 226, 228 that provides an unobstructed view, or a less obstructed view, of that event.

Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method performed using control circuitry, the method comprising:
    receiving content recorded by a plurality of user devices, the content including first content recorded by a first user device during a first time interval and second content recorded by a second user device during a second time interval;
    determining a first time point, wherein the first time point is a start time of the first time interval or an end time of the first time interval;
    determining a location of the first user device during at least a portion of the first time interval;
    determining that the second time interval includes the first time point;
    determining a location of the second user device during the second time interval;
    based on the determination that the second time interval includes the first time point, and on the determined location of the second user device, selecting the second content from the content recorded by the plurality of user devices;
    modifying the first content to include at least a portion of the second content;
    detecting an occurrence of an event at a second time point that is not included in the first time interval;
    determining that the second content includes a recording of the event, based on the second time point, a start time of the second interval, and an end time of the second interval; and
    using the control circuitry, determining, based on a video component of the second content, that the event is shown in the video component of the second content, wherein the selection of the second content is further based on the determination that the event is shown in the video component of the second content.

2. The method of claim 1, wherein determining that the second content includes the recording of the event is further based on:
    an audio component of the second content; and/or
    a video component of the second content.

3. The method of claim 1, wherein detecting the occurrence of the event comprises one or more of:
    analyzing an audio component of recorded content including the event;
    analyzing a video component of recorded content including the event;
    analyzing keywords in an audio commentary relating to the event;
    analyzing keywords in social media posts relating to the event; or
    analyzing keywords in information accessed from a website.

4. The method of claim 1, further comprising:
    using the control circuitry, providing, to the first user device, information corresponding to recorded content from the plurality of user devices that are determined to include the event; and
    using the control circuitry, receiving input indicating a selection of the second content from the recorded content from the plurality of user devices that are determined to include the event;
wherein the selection of the second content is further based on the received input.

5. The method of claim 1, wherein receiving the content recorded by the plurality of user devices comprises:
identifying, from user generated content uploaded to a cloud service or social networking platform, content recorded at a geographical location corresponding to the event during a predetermined time period; and
obtaining the content recorded at the geographical location during the predetermined time period, from the cloud service or social networking platform.

6. The method of claim 1, wherein selecting the second content is further based on:
a location of the second user device during at least a portion of the second time interval; and/or
a field of view of the second user device during at least a portion of the second time interval.

7. The method of claim 1, further comprising:
detecting one or more faces in the second content;
wherein modifying the first content includes modifying a video component of said at least a portion of the second content to obscure the detected one or more faces.

8. A non-transitory computer-readable medium, in which is stored computer-readable instructions including:
instructions to receive content recorded by a plurality of user devices, the content including first content recorded by a first one of the user devices during a first time interval and second content recorded by a second one of the user devices during a second time interval;
instructions to determine a first time point, wherein the first time point is a start time of the first time interval or an end time of the first time interval;
instructions to determine a location of the first user device during at least a portion of the first time interval;
instructions to determine that the second time interval includes the first time point;
instructions to determine a location of the second user device during the second time interval;
instructions to select the second content from the content recorded by the plurality of user devices, based on the determination that the second time interval includes the first time point, and based on the determined location of the second user device; and
instructions to modify the first content to include at least a portion of the second content;
instructions to detect an occurrence of an event at a second time point that is not included in the first time interval;
instructions to determine that the second content includes a recording of the event, based on the second time point, a start time of the second interval, and an end time of the second interval; and
instructions to determine, based on a video component of the second content, that the event is shown in the video component of the second content, wherein the selection of the second content is further based on the determination that the event is shown in the video component of the second content.

9. An apparatus comprising:
control circuitry configured to:
receive content recorded by a plurality of user devices, the content including first content recorded by a first one of the user devices during a first time interval and second content recorded by a second one of the user devices during a second time interval;
determine a first time point, wherein the first time point is a start time of the first time interval or an end time of the first time interval;
determine a location of the first user device during at least a portion of the first time interval;
determine that the second time interval includes the first time point;
determine a location of the second user device during the second time interval;
based on the determination that the second time interval includes the first time point, and on the determined location of the second user device, select the second content from the content recorded by the plurality of user devices; and
modify the first content to include at least a portion of the second content;
detect an occurrence of an event at a second time point that is not included in the first time interval;
determine that the second content includes a recording of the event, based on the second time point, a start time of the second interval, and an end time of the second interval; and
determine, based on a video component of the second content, that the event is shown in the video component of the second content, and wherein the selection of the second content is further based on the determination that the event is shown in the video component of the second content.

10. The apparatus of claim 9, wherein the control circuitry is configured to determine that the second content includes the recording of the event further based on:
an audio component of the second content; and/or
a video component of the second content.

11. The apparatus of claim 9, wherein the control circuitry is configured to detect the occurrence of the event by one or more of:
analyzing an audio component of recorded content including the event;
analyzing a video component of recorded content including the event;
analyzing keywords in an audio commentary relating to the event;
analyzing keywords in social media posts relating to the event; or
analyzing keywords in information accessed from a website.

12. The apparatus of claim 9, wherein the control circuitry is further configured to:
provide, to the first user device, information corresponding to recorded content from the plurality of user devices that are determined to include the event;
receive input indicating a selection of the second content from the recorded content from the plurality of user devices that are determined to include the event; and
select the second content further based on the received input.

13. The apparatus of claim 9, wherein the control circuitry is further configured to, when receiving the content recorded by the plurality of user devices:
identify, from user-generated content uploaded to a cloud service or social networking platform, content recorded at a geographical location corresponding to the event during a predetermined time period; and
obtain, from the cloud service or social networking platform, the content recorded at a geographical location corresponding to the event during a predetermined time period.

14. The apparatus of claim 9, wherein the control circuitry is configured to select the second content further based on:
   a location of the second user device during at least a portion of the second time interval; and/or
   a field of view of the second user device during at least a portion of the second time interval.

15. The apparatus of claim 9, wherein the control circuitry is further configured to:
   detect one or more faces in the second content;
   modify a video component of said at least a portion of the second content to obscure the detected one or more faces.

16. The apparatus of claim 9, further comprising:
   a cloud server configured to receive uploads of the recorded content from at least some of the plurality of user devices.

\* \* \* \* \*